United States Patent
Kermelk et al.

(10) Patent No.: US 8,042,879 B2
(45) Date of Patent: Oct. 25, 2011

(54) VEHICLE WHEEL AND METHOD FOR MANUFACTURING IT

(75) Inventors: Werner Kermelk, Much (DE); Umberto Afeltra, Gussago (IT); Udo Friese, Ahlen (DE); Peter Reh, Windeck (DE)

(73) Assignee: Hayes Lemmerz Holding GmbH, Kenigswinter (DE)

( * ) Notice: Subject to any disclaimer, the term of this patent is extended or adjusted under 35 U.S.C. 154(b) by 241 days.

(21) Appl. No.: 12/515,764

(22) PCT Filed: Nov. 20, 2007

(86) PCT No.: PCT/EP2007/010031
§ 371 (c)(1),
(2), (4) Date: May 21, 2009

(87) PCT Pub. No.: WO2008/061703
PCT Pub. Date: May 29, 2008

(65) Prior Publication Data
US 2010/0052413 A1   Mar. 4, 2010

(30) Foreign Application Priority Data
Nov. 23, 2006 (DE) .......................... 10 2006 055 704

(51) Int. Cl.
*B60B 3/04* (2006.01)
*B21D 53/30* (2006.01)

(52) U.S. Cl. ......... 301/63.106; 301/63.101; 29/894.321; 29/894.322

(58) Field of Classification Search ............. 301/63.101, 301/63.102, 63.103, 63.104, 63.105, 63.106, 301/64.101, 64.5; 29/894.321, 894.322, 29/894.323, 894.353, 894.354
See application file for complete search history.

(56) References Cited

U.S. PATENT DOCUMENTS
1,376,205 A * 4/1921 Hoffman .................. 301/63.101
(Continued)

FOREIGN PATENT DOCUMENTS
CH            658224 A5   10/1986
(Continued)

OTHER PUBLICATIONS
Machine Translation of JP2000351301A.*
(Continued)

*Primary Examiner* — Kip T Kotter
(74) *Attorney, Agent, or Firm* — MacMillan, Sobanski & Todd, LLC (57) ABSTRACT

The invention relates to a vehicle wheel, in particular a hybrid vehicle wheel, composed of a wheel disc, which is fabricated from lightweight metal as a cast part, and a rim ring, which is made from steel, is connected to the wheel disc in a rotationally fixed fashion and has at least one rim horn and a drop base edge, and a method for manufacturing such a hybrid vehicle wheel. In order to be able to manufacture the hybrid vehicle wheel at low cost and to ensure sufficient force flow between the rim ring and the wheel disc, the wheel disc has, on the disc edge, a contour which is matched to the profile of the rim horn and drop base edge and extends over the distance between them and on which the rim ring bears in the mounted state of the wheel disc and rim ring while clamping the wheel disc between a first pressure zone on the drop base edge and a second pressure zone on the rim horn. Fitting is carried out by folding over or rolling over a rim ring blank onto the edge of the disc.

18 Claims, 3 Drawing Sheets

U.S. PATENT DOCUMENTS 4,213,234 A * 7/1980 Ware .................. 29/894.322
5,526,977 A * 6/1996 Wei ........................ 228/208

FOREIGN PATENT DOCUMENTS

| DE | 8216339 | U1 | 8/1982 |
| DE | 19804739 | A1 | 8/1999 |
| DE | 10058807 | A1 | 6/2002 |
| EP | 0017619 | A2 | 10/1980 |
| JP | 59106302 | A * | 6/1984 |
| JP | 60151102 | A | 8/1985 |
| JP | 02099402 | A * | 4/1990 |
| JP | 2000351301 | A * | 12/2000 |

OTHER PUBLICATIONS

International Search Report from PCT/EP2007/010031 dated Feb. 18, 2008.

* cited by examiner

VEHICLE WHEEL AND METHOD FOR MANUFACTURING IT

CROSS-REFERENCE TO RELATED APPLICATIONS

This application is a national stage of International Application No. PCT/EP2007/010031 filed Nov. 20, 2007, the disclosures of which are incorporated herein by reference in entirety, and which claimed priority to German Patent Application No. 10 2006 055 704.2 filed Nov. 23, 2006, the disclosures of which are incorporated herein by reference in entirety.

BACKGROUND OF THE INVENTION

The present invention relates to a vehicle wheel, comprising a wheel disk fabricated as a casting, preferably casted from lightweight metal, with a disk edge running concentrically around a wheel axis and a rim ring, preferably fabricated from steel, rotationally locked to the wheel disk and having at least one rim flange, at least one bead seat, one drop center rim well base and at least a well base edge, for seating a tire on the outside of the rim ring. The invention also relates to a method for manufacturing such a hybrid vehicle wheel from a wheel disk fabricated as a casting, preferably from lightweight metal, and a rim ring, preferably of steel, in operations entailing the provision of a rim ring preform having at least one rim flange, a bead seat, a rim well base and a well base edge, and the provision of a wheel disk, which has a disk edge running concentrically around the wheel axis. The invention is intended, in particular, for vehicle wheels for motor vehicles, especially passenger automobiles.

In the state of the art the trend with vehicle wheels has firstly been towards the conventional steel vehicle wheels comprising a steel rim ring, largely manufactured by metal forming processes on a production line, and a steel wheel disk manufactured on a separate production line, which at the end of the production lines are welded together to form the vehicle wheel. The rim ring and the wheel disk here each take on their final form on the production line before being welded together.

In addition, in the state of the art there has been a trend towards lightweight metal wheels, especially of aluminum, which are manufactured as integrally cast constructions or as wheel forgings. In the case of multipart lightweight metal wheels a cast or forged wheel disk is joined to a rim of aluminum strip manufactured by profile rolling or roll forming. They can either be joined by detachable bolted connections or welded.

DE 100 58 807 A1 discloses a hybrid vehicle wheel in which the wheel disk and the rim ring are produced from different materials and the wheel disk and the rim ring are joined together by friction welding. DE 198 04 739 A1, for example, discloses the provision, in a wheel disk fabricated from lightweight metal, of an outer rim flange integrally formed on the disk, and the formation of a welded-on extension to the wheel disk in the area of the outer bead seat, a rim ring, correspondingly formed without the outer rim flange, then being attached thereto by friction welding.

A vehicle wheel of generic type is disclosed by DE 82 16 339 U1. In the case of this vehicle wheel a wheel disk is manufactured as a casting, onto which a rim ring comprising all the elements of a wheel rim is then fitted by shrinking on. The shrinking-on is intended to achieve a press fit between the rim ring and the wheel disk, bearing with its circumferential edge against the inside of the rim ring of the bead seat, which rotationally locks the wheel disk and the rim ring together. In order to increase the friction in the press fit between the ring rim and the wheel disk, granular material, projections or a heat-resistant adhesive lacquer can be introduced into the opposing faces. In the area of the bead seat, which on the outside of the ring has an inclination of approximately 5° in the case of vehicle wheels and an inclination of approximately 15° in the case of commercial vehicle wheels (tapered seat wheels), the rim ring must be provided with an additional material thickening, in order that the rim ring can taper conically in diameter on the inside of the ring from the well base edge to the outside of the wheel. In order to be able to shrink the rim ring onto the wheel disk, the rim ring must be heated to temperatures in excess of 300°, which is extremely costly in terms of energy and results in high production costs. Other disadvantages beside the high production costs are that the high temperatures which have to be applied can cause material changes in the preferably formed rim ring, and in addition an anticorrosion protection, which before joining together has been applied at joining sites that are subsequently no longer accessible, is destroyed by the high temperatures, so that the vehicle wheel fabricated by shrinking on is highly susceptible to corrosion, especially at the joining sites.

BRIEF SUMMARY OF THE INVENTION

A feature of the invention is to create a vehicle wheel, in particular a hybrid vehicle wheel, and a method for manufacturing it, which can be produced at low cost, which avoids the aforementioned disadvantages of shrinking on and at the same time ensures an adequate force flux between the rim ring and the wheel disk, which will reliably counteract the high circumferential forces resulting from the braking and acceleration moments that occur in the operation of the vehicle wheel.

According to the invention these and other features are achieved by the vehicle wheel as claimed in claim 1, in that the wheel disk at the disk edge has a contour which is adapted to the profile of the rim flange and the well base edge and extends over the interval between them, and against which contour the rim ring bears when the wheel disk and the rim ring are in the assembled state, clamping the wheel disk between a first pressure zone on the well base edge and a second pressure zone on the rim flange. In the case of the vehicle wheel according to the invention, the rim ring is therefore tightly clamped to the wheel disk by creating two opposing areas or zones at the disk edge of the wheel disk, against which zones the rim flange on the one hand and the well base edge of the rim ring on the other can bear under pressure, in such a way that clamping achieves an adequate force closure between the wheel disk and the rim ring. Since the wheel disk can be formed or manufactured as a casting, it may in principle be endowed with any suitable or desired styling.

In a preferred development of a vehicle wheel according to the invention an additional contact zone is formed between the two pressure zones at the transition of the well base edge to the bead seat. This additional contact zone may primarily serve to absorb the radial forces exerted on the vehicle wheel in running operation, for example the weight of the vehicle, whilst the two pressure zones serve primarily for the force closure by clamping the wheel disk to the inside of the rim ring. It is particularly advantageous if the contact zones are formed by means of a security hump on the rim ring and a circumferential stay cam on the disk edge bearing on the inside thereof. It goes without saying that the corresponding stay cam is therefore preferably already formed on the disk part during casting of the basic shape of the wheel disk. In the assembled state the rim ring, preferably at the contact zone, is braced against the disk edge and/or the stay cam substantially only in a radial direction.

The rim ring is not fitted onto the disk edge of the wheel disk by shrinking on, as in the state of the art, but according to the invention preferably in that the rim ring is clamped to the disk edge by upsetting and/or rolling over. It is particularly advantageous here if in the assembled state achieved between the bearing zone on the security hump and the second pressure zone on the rim flange no contact areas, or at least in part no direct contact areas, exist between the rim ring and the circumference of the disk. In the assembled state of the finished vehicle wheel it is therefore particularly advantageous if the inside of the rim ring is separated from the disk edge by a gap between the pressure and contact zones. The gap or the absence of direct points of contact is especially effective, during the upsetting or rolling over of the rim ring or a rim ring preform, in allowing an over-stretching or additional elongation of the bead seat towards the wheel axis, which enables a clamping force to be applied, which on relaxation of the upsetting tool or withdrawal of the rollover tool counteracts any tendency of the rim ring material to rebound or recover. For this purpose the contour of the disk edge against the bead seat section may, in particular, have a reduction. According to an advantageous development of a vehicle wheel, especially one manufactured by upsetting, the reduction may produce the greatest interval between these constituent surfaces in the assembled state of the rim ring and the disk edge. The reduction can at the same time help to reduce the weight of the finished vehicle wheel, since in this area no contact should exist between the rim ring and the disk edge, so as to be able to apply a defined clamping between the pressure zones and to avoid any redundancy. In an alternative development of a vehicle wheel, advantageously manufactured by rolling over, the contour of the disk edge against the bead seat section may be provided with at least one circumferential channel, into which the rim ring is partially pressed during the rollover process, in order to achieve an additional, in particular a positively interlocking torsional safeguard by virtue of the groove-shaped channels and the material compressed into the latter. It is particularly advantageous if the one or more channels is/are formed to run circumferentially or helically around the circumference of the bead seat section.

According to one exemplary embodiment the rim ring and the contour of the disk edge may have transitional sections at the transition of the rim flange into the bead seat, where a third pressure zone is formed. This third pressure zone serves to ensure that firstly a clamping is achieved between the first and third pressure zones and furthermore that a clamping is produced between the second and the third pressure zones, without any redundancy occurring, it furthermore being possible to apply the overstretching of the vehicle wheel in the area of the bead seat, in order to achieve clamping at both pairs of pressure zones. In an alternative exemplary embodiment, the third pressure zone can be dispensed with and at the transition of the rim flange into the bead seat the rim ring and the contour of the disk edge again have transitional areas, which are oriented perpendicularly to the wheel axis or have an angling of >90°. This means that in the upsetting or rollover process no force-transmitting contact points or pressure zones are produced in these areas.

In all developments of a vehicle wheel according to the invention it is particularly advantageous if the rim ring, at the end that forms the rim flange bearing on the disk edge, is bent over substantially perpendicularly to the wheel axis and/or if the contour of the disk edge against the rim flange section has indentations with a contact face oriented preferably perpendicularly to the wheel axis. The rim flange section against the disk edge here serves to form the pressure zone together with the inside of the upset and/or rolled-up and thereby bent-over outer rim flange. In the assembled vehicle wheel the indentation on the rim flange points towards the outside of the wheel, so that it lies opposite the transitional section or the well base edge section at the disk edge, in order to be able to produce the clamping between the first and second or the first and third and the second and third pressure zones.

The first pressure zone can advantageously be arranged on or close to the transitional piece of the well base edge into the well base floor. The first pressure zone can here be arranged in radial alignment with or axially slightly offset in relation to the hub connection face on the vehicle wheel, in order to achieve an advantageous bracing of the moments. Other embodiments are also possible, however.

The well base edge section at the disk edge can run at an angle of approximately 55° to 65°, preferably approximately 62°±3° to the wheel axis, and/or the well base edge at the rim ring may preferably run at an angle at least 1°-2°, preferably approximately 5°±3° steeper than the well base edge section at the disk edge, in order to form a defined pressure zone, in which sufficiently high clamping forces can be applied.

In all developments it is particularly advantageous if the rim ring is integrally formed, particularly from a formed sheet steel and already at the rim ring preform stage is endowed with or comprises both rim flanges, both bead seats, the well base and both well base edges, together with any security hump, this rim ring preform substantially being formed into its finished shape only in the area of the ring edge contour during the upsetting or rollover processes. Adhesives and/or sealants for sealing or as anti-corrosion protection may be introduced between the rim ring and the wheel disk, especially in the area of the pressure zones and contact zones.

In the case of method for manufacturing the hybrid vehicle wheel the aforesaid objects are achieved according to the invention specified in claim 13, in that the wheel disk at the disk edge has a contour matched to the profile of the rim flange and the well base edge and extending over the distance between them, and that the rim ring preform is fixed, rotationally locked to the disk edge, by means of at least one upsetting operation and/or rollover operation, a first pressure zone being formed between the rim ring and the wheel disk at the well base edge and at least one second pressure zone being formed between the rim ring and the wheel disk at the rim flange for clamping the wheel disk.

In order to be able to apply adequate clamping forces, it is particularly advantageous if the wheel disk is provided, at least in the bead seat section, with a reduction, into which the bead seat of the rim ring or the rim ring preform is at least partially pressed in the upsetting or rollover process to compensate for the rebound occurring. The upsetting may be performed in particular by means of multi-jaw upsetting tools, each upsetting jaw preferably having a shape which is substantially a negative shape of the finished rim ring. It is particularly advantageous here if the negative shape in the area of the bead seat produces an over-stretching of the rim ring preform towards the wheel axis, making it possible to achieve the relatively high clamping forces at the pressure zones. The rolling over can be performed by one or more pressure rollers. According to an advantageous development the setting angle of the pressure roller(s) relative to the wheel axis is adjustable or is adjusted during the rollover operation. A combined upsetting and rollover process can also advantageously be used in order to achieve an optimum connection between the wheel disk and the rim ring in the various pressure zones.

It is also possible in the method according to the invention either to apply only two pressure zones or for a third pressure zone to be formed at the transitional section of the rim flange into the bead seat. It is furthermore advantageous if in the upsetting process a contact zone is formed at the transitional section between the bead seat and the well base edge, the rim ring being upset or pressed into contact with the disk edge of the wheel disk only at two or three pressure zones and at the contact zone.

Since the rim ring is fitted onto the wheel disk largely without the application of heat, it is particularly advantageous in the method according to the invention the steel rim ring and/or the lightweight metal wheel disk to be pretreated with an electro-coating primer or a corrosion-inhibiting primer prior to upsetting, the primer substantially retaining its full corrosion-inhibiting characteristics even when the vehicle wheel is assembled.

Other advantages of this invention will become apparent to those skilled in the art from the following detailed description of the preferred embodiments, when read in light of the accompanying drawings.

DETAILED DESCRIPTION OF THE INVENTION

Figure 1:
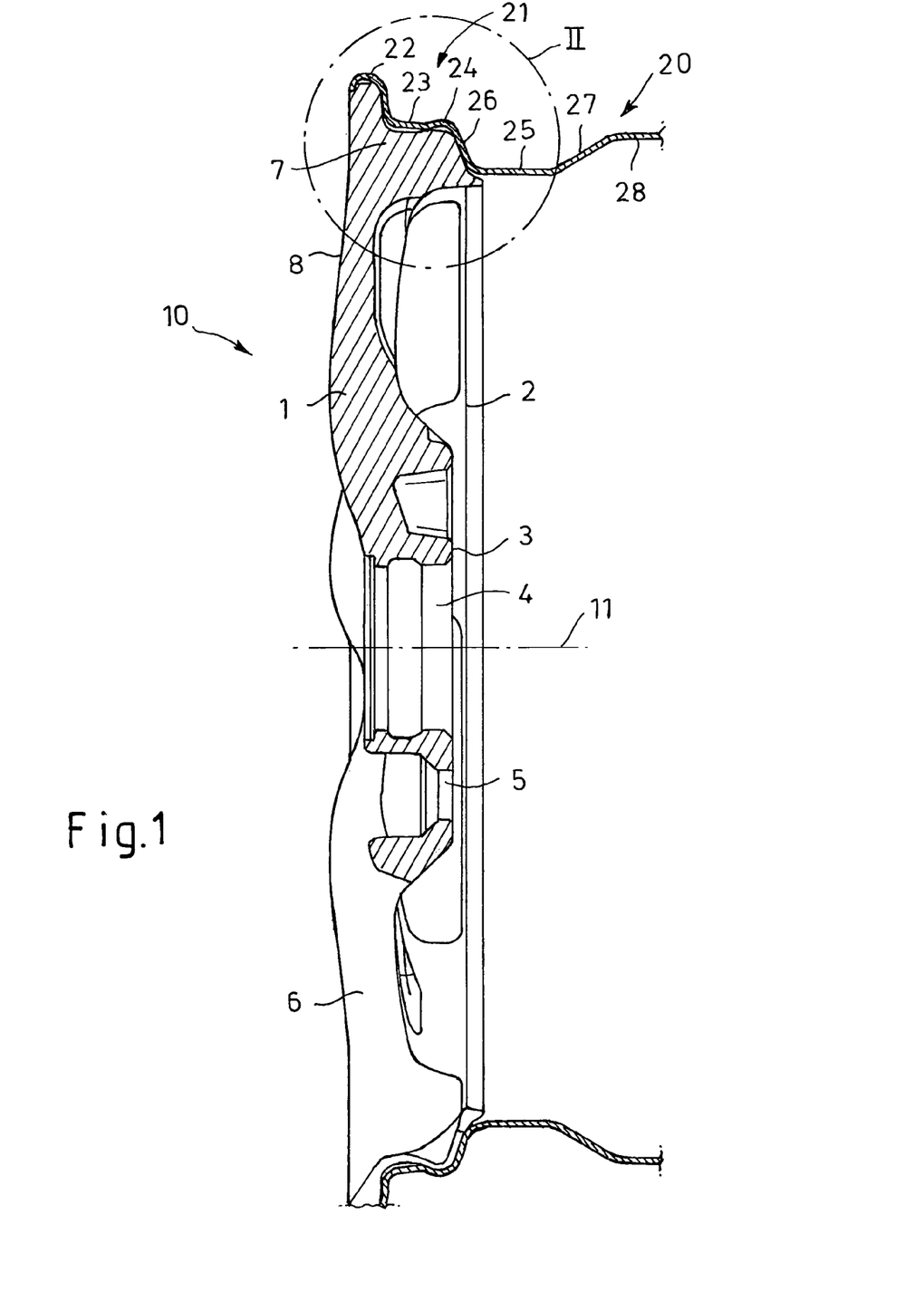
FIG. 1 schematically shows a longitudinal section through a vehicle wheel according to the invention, partially cut away.
Figure 2:
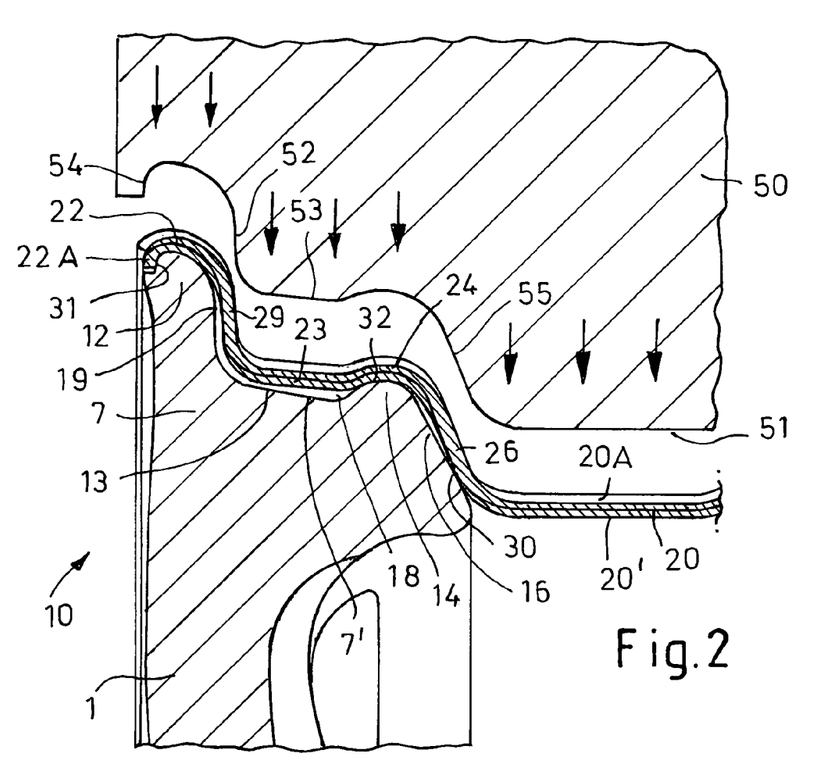
FIG. 2 schematically shows an enlarged representation of the detail according to II in FIG. 1 with a rim ring preform and the tool for manufacturing the rim ring preform at the disk edge.

In FIGS. 1 and 2 the reference numeral 10 denotes a vehicle wheel according to the invention, which substantially comprises a wheel disk 1 and a rim ring 20 rotationally locked to the former. The vehicle wheel 10 according to the invention is embodied as a hybrid vehicle wheel, in which the wheel disk 1 comprises a casting of lightweight metal such as, in particular, aluminum, whilst the rim ring 20 is manufactured by forming a flat lamellar steel material into a circular blank and then, for example, rolling out a circular rim ring 20 having the features specific to the ring rim. The wheel disk 1, represented merely by way of example in FIG. 1, in a manner known in the art comprises a hub connection face 3 on its rear side 2, facing the vehicle or the vehicle hub in operational service and having a central hub or center hole 4 and multiple bolt holes 5 distributed uniformly around the wheel axis 11, through which holes the wheel disk 1 can be bolted to the vehicle hub. The wheel disk 1 has suitable vent holes 6 and can be provided with basically any suitable or desired styling of a vehicle wheel that can be manufactured by the casting process. Since the wheel disk is manufactured as a casting, there are basically no limits placed on the design of this wheel disk.

In order to be able to support a tire on the vehicle wheel 10 allowing a vehicle to move by rolling on the road, the rim ring 20 is firmly connected at the outer rim ring end 21 to the disk edge 7 formed circumferentially around the wheel axis 11. As can clearly be seen from FIG. 1, the disk edge 7 is of relatively robust design and in the exemplary embodiment shown extends slightly towards the inside of the wheel beyond the hub connection face 3, in order to clamp the rim ring 20 to the disk edge 7 through at least one upsetting operation, as is still to be explained.

The rim ring 20, only ever partially represented in all the drawings, has an outer rim flange 22, an outer bead seat 23, a security hump 24, a drop center rim well base 25 with an outer well base edge 26 and an inner well base edge 27, a possibly ironed area 28 and adjoining this in turn at least one bead seat and an inner rim flange, which are not shown here, however. In order to anchor the rim ring 20 firmly to the disk edge 7 by upsetting, the disk edge 7 extends from the outside 8 of the disk to that area against which the well base floor rests in the assembled state. The disk edge 7 of the wheel disk 1 has an axial length, which extends at least over the distance between the rim flange 22 and the outer well base edge 26 of the rim ring 20.

To further explain the upsetting process, reference will now be made to FIG. 2, which basically represents a side view of only the robust disk edge 7 of the wheel disk 1. In FIG. 2 the rim ring 20, already torsionally anchored to the disk edge 7 by an upsetting process, is represented with shading, and the as yet unanchored rim ring preform 20A without shading. As can clearly be seen from FIG. 2, the disk edge 7, at its circumferential edge, has a contour 7', which is substantially adapted to the shape of the rim ring 20 between the outer rim flange 22 and the outer well base edge 26. The disk edge 7 accordingly encompasses a rim flange section 12, a bead seat section 13, a circumferential cam 14 and a well base edge section 16, which are situated opposite the rim flange 22, the bead seat 23, the security hump 24 and the well base edge 26 respectively. When upsetting the rim ring preform 20A onto the disk edge 7, a partial, additional deformation of the rim ring preform 20A is produced by means of multiple, for example twelve, correspondingly designed upsetting jaws 50, distributed around the circumference of a wheel axis of the wheel disk 1, to form the finished rim ring 20. On its inside 51, each upsetting jaw 50 here has a profile, which corresponds approximately to the negative profile of the rim ring 20 between the outer rim flange 22 and well base 25. As a comparison of the rim ring preform 20A, not yet formed by the upsetting jaws 50, and the rim ring 20 shows, a partial direct contact between the disk edge 7 and the rim ring 20 is produced only on upsetting. According to the invention this contact here does not exist over the entire contour 7' of the disk edge 7, but only locally at three points 30, 31, 32 spaced at intervals from one another in FIG. 2. In the upsetting process, two pressure zones or pressure points, which serve to clamp the disk edge 7 between these two pressure zones, are formed between the rim ring 20 and the disk edge 7 or its contour 7' in the exemplary embodiment of the vehicle wheel 10 in FIG. 2. The first pressure zone is situated on the rear side of the disk at the first contact point, denoted by the reference numeral 30, between the well base edge 26 and the well base edge section 16, and a second pressure zone exists at the point, denoted by the reference numeral 31, between the rim flange 22 and the rim flange section 12 on the outside of the rim flange section 12. Since the resultant forces in each case act on the pressure zones 30, 31 in an axial direction, and are directed towards one another, a clamping force can be applied over the two pressure zone 30, 31, which will suffice to clamp the rim ring 20 and the wheel disk 1 with adequate force closure, so that even the moments occurring in braking and acceleration produce no relative rotation between the rim ring 20 on the one hand and the wheel disk 1 on the other.

It can be seen from FIG. 2 that besides the two pressure zones 30, 31 there is just one contact zone 32 in the area of the cam 14 and the security hump 24, compressive forces and seating forces at this point being able to act solely in a radial direction and not in an axial direction. The clamping force at the pressure zones 30 and 31 and in the area of the contact zone 32 is applied essentially in that the rim ring preform 20A in the area of the bead seat 23 experiences a radial deformation towards the wheel axis, which goes beyond the deformation actually necessary. For this purpose a sufficiently large depression or reduction 18 is formed in the area of the bead seat section 13 of the wheel disk 1, into which, in the upsetting process, the rim ring preform 20A can be pressed beyond the limit position, causing the two pressure zones 30, 31 to be moved axially towards one another and therefore increasing the clamping force. On either side of each pressure zone 30, 31 and the contact zone 32 there is therefore a sufficient gap interval between the inside 20' of the rim ring 20 and the contour 7' or the outside of the wheel disk 7 to apply the clamping forces over these two pressure zones 30, 31. In the area of the transitional section 29 between the rim flange 22 and the bead seat 23 and the corresponding transitional area 19 at the contour 7' of the disk edge 7, these sections therefore each run perpendicularly to the wheel axis, and the upsetting jaw 50 here also has a section 52, which is likewise aligned perpendicularly to the wheel axis or axis of rotation of the wheel disk 1, so that no drawing out can be applied over this section in a radial or axial direction. The face section 53 of the upsetting jaw 50 adjoining this jaw section, on the other hand, produces an over-drawing of the bead seat 23 in the upsetting of the rim ring preform 20A onto the disk edge contour.

A complete enclosure of the rim flange section 12 by means of the end lug 22A on the rim flange 22 is achieved via the upsetting jaw section 54 at the left-hand end of the negative shape of the upsetting jaw 50 in FIG. 2. In addition, the upsetting jaw flank 55 presses the rim ring preform 20A essentially in the area of curvature between the well base edge 26 and the well base 25 against the well base edge section 16 at the disk edge 7. The upsetting jaw flank 55 is here angled by an angle of approximately 62° to 65° to the wheel axis, whilst the edge section 16 at the disk edge 7 is angled approximately 3° less steeply in order to achieve a defined pressure zone 30 and to ensure that on both sides of the pressure zone 30 a gap interval exists between the inside 20' of the rim ring 20 and the surface or outside of the disk edge 7.

Figure 3:
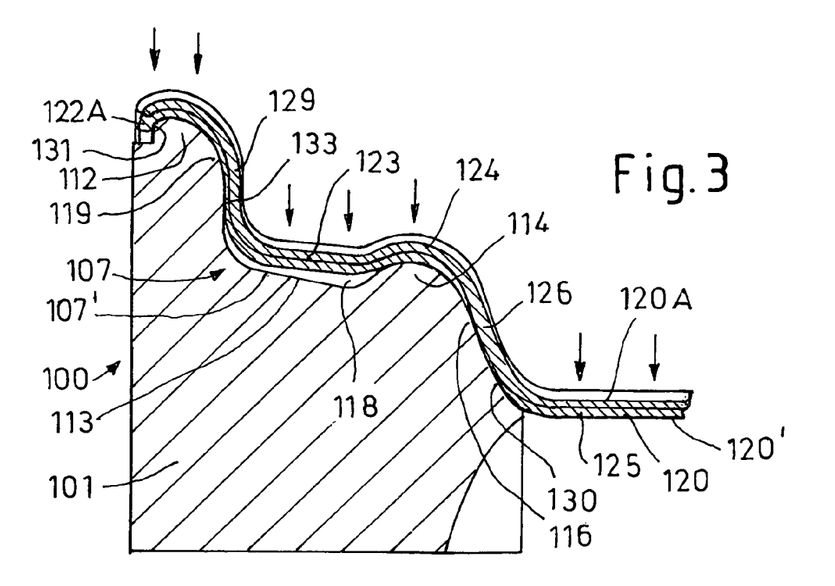
FIG. 3 in a representation similar to FIG. 2 schematically shows the joint in a vehicle wheel according to a second exemplary embodiment.

In the case of the vehicle wheel 100 shown schematically in FIG. 3 components and elements performing an identical function to those in the preceding exemplary embodiment are provided with reference numerals increased by 100. In the vehicle wheel 100 also, a rim ring preform 120A is anchored to the disk edge 107 of a wheel disk 101 by upsetting. In contrast to the preceding exemplary embodiment, however, three pressure zones 130, 131 and 133 are formed on the vehicle wheel 100. As in the preceding exemplary embodiment, the first pressure zone 130 is situated at the point of contact of the well base edge 126 of the rim ring 120 against the well base edge section 116 of the contour 107' of the disk edge 107. The second pressure point 131 is formed between the outer edge of the rim flange section 112 and the end lug 122A of the rim flange 122 pressed onto this. A contact zone 132 for radial forces is furthermore formed between the cam 114 and the security hump 124 as in the preceding exemplary embodiment. The third pressure zone, representing an addition compared to the preceding exemplary embodiment, is here formed between the disk transitional section 119 at the transition of the rim flange section 112 into the bead seat section 113 and the transitional section 129 of the rim ring 120 bearing against the disk transitional section 119. The opposing compressive forces between the pressure points 131 and 133, and 130 and 133 are again achieved through over-upsetting or over-drawing the bead seat 123 into a reduction 118 or depression in the area of the bead seat section 113 of the wheel disk 101, a gap or intermediate space again in the vehicle wheel 100 being formed on both sides of each of the pressure zones 131, 130, 133, between the inside 120' of the rim ring 120 and the outside face or contour 107' of the disk edge 107. The gap on both sides of the pressure zone 133 may prove relatively small at 0.2 to 0.5 mm, although given a suitable rigidity of the steel material for the rim ring 120, different curvatures of the disk transitional section 119 and the transitional section 129 of the rim ring 120 may accordingly suffice for the application of adequate clamping forces.

In both of the aforementioned exemplary embodiments, the vehicle wheel 10 or 100 is manufactured by a method, in which a rim ring preform is fitted onto the disk edge of a wheel disk produced as a casting through at least one upsetting operation with upsetting jaws, for example twelve upsetting jaws, distributed around the circumference. Before joining the rim ring preform and the wheel disk together by upsetting, both parts, especially on the faces on the inside of the rim ring or rim ring preform and the outside of the disk edge that bear against one another in the assembled state or are separated from one another only by a small gap interval, may be protected against corrosion by a suitable primer, especially an electro-painting primer, the primer being neither weakened nor removed, even by the upsetting process.

Figure 4:
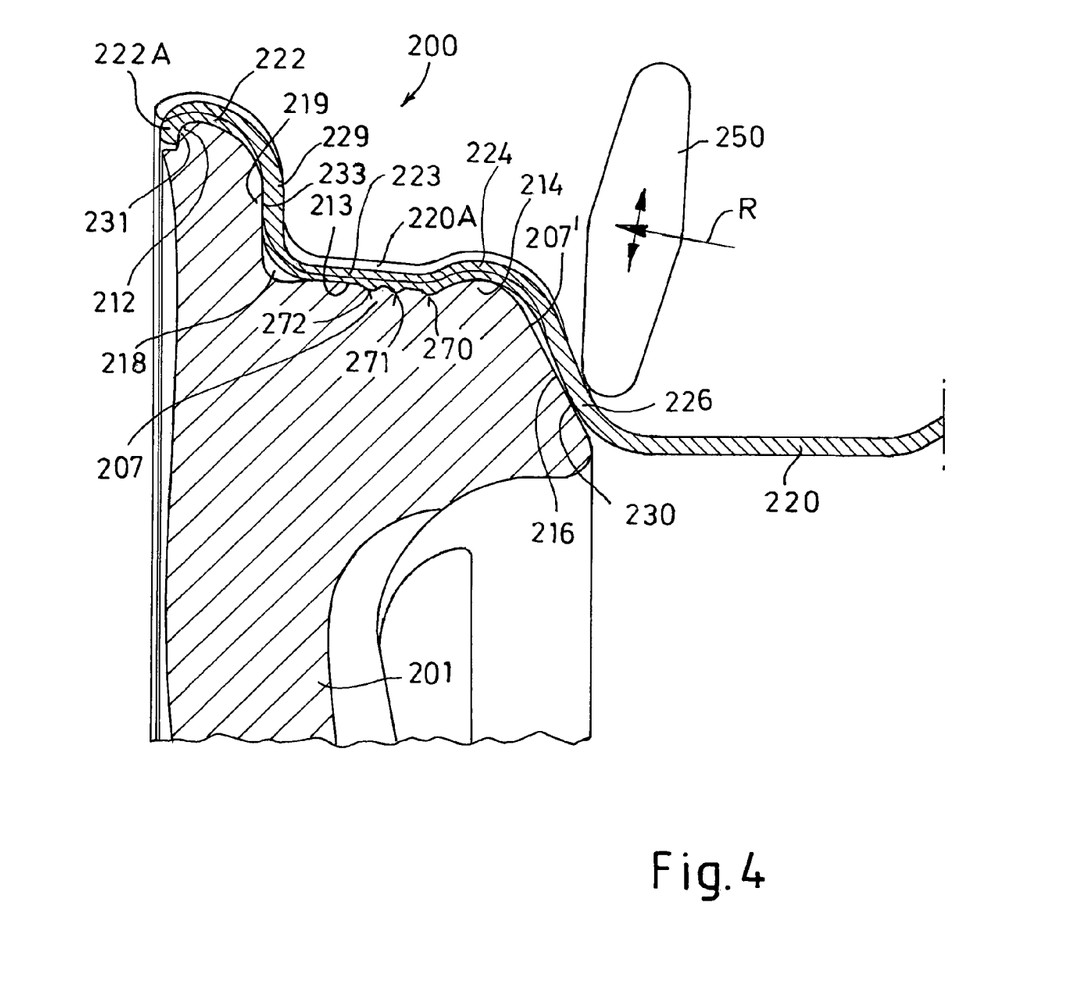
FIG. 4 in a representation similar to FIG. 2 schematically shows the joining of the rim ring preform and the disk edge by rolling over in a vehicle wheel according to a third exemplary embodiment.

In the case of the vehicle wheel 200 shown schematically in FIG. 4 also, sections of the wheel disk 201 and the rim ring 220 performing an identical function are again provided with reference numerals increased by 100. In contrast to the preceding exemplary embodiments, in the case of the vehicle wheel 200 a rim ring preform 220A, which is represented without shading, is anchored to the disk edge 207 of the wheel disk 201 by rolling over. Rolling over is preferably performed in a number of rollover operations by deforming the rim ring preform 220A into the rim ring 220 over the entire width of the disk edge 207 by means here of a pressure roller 250. The pressure roller 250 can advantageously, as indicated by the arrows, be adjusted transversely to its roller axis R and the setting angle of the pressure roller 250 is furthermore preferably also adjustable relative to the wheel axis. Multiple pressure rollers distributed over the circumference may also be used in order to anchor the rim ring 220 to the disk edge 207 rapidly through simultaneous machining of multiple points. As in the development according to FIG. 2, three pressure zones 230, 231 and 233 are here also formed between the rim ring 220 and the disk edge 207, at least one and preferably all pressure zones 230, 231 and 233 being produced by rolling over and not by upsetting, as in the preceding exemplary embodiments. The first pressure zone 230 is again situated at the contact zone of the well base edge 226 of the rim ring 220 with the well base edge section 216 on the contour 207' of the disk edge 207; the second pressure zone 231 is formed between the outer edge of the rim flange section 212 and the end lugs 222A of the rim flange 222 pressed against this, and the third pressure zone 233 is formed between the disk transitional section 219 and the transitional section 229 of the rim ring 220. In a departure from the preceding exemplary embodiment, in the vehicle wheel 200 the bead seat 223 of the rim ring 220 bears over virtually its entire axial extent against the bead seat section 213 of the wheel disk. In the transitional area between the third pressure zone 233 and the bead seat section 213 a narrow reduction 218 or depression is formed at the disk edge 207, in which the rolled-over rim ring 220 is separated by an interval from the disk edge 207. The bead seat section 213 of the disk edge 207, substantially adjacent to the cam 214, against which the security hump 224 of the rim ring is pressed, is here provided with three channels 270, 271, 272 each preferably running through 360°, which could also consist of a single helical channel extending between the cam 214 and the disk transitional section 219. In rolling the rim ring preform 220A over onto the contour 207' by means of the pressure roller 250, the material of the rim ring 220 is pressed at least partially into the corresponding channels 270, 271, 272, so that an additional positively interlocking anchorage is produced inside the channels 270 to 272, affording an additional positively interlocking anchorage and hence an additional safeguard against torsion between the rim ring 220 and the wheel disk 201.

For the person skilled in the art the preceding description will suggest numerous modifications falling within the scope of the patent claims attached. In the exemplary embodiments the bead seat section at the disk edge still runs approximately parallel and at a distance from the bead seat of the rim ring. This area in particular is especially well suited to the incorporation of weight-minimizing deeper indentations or hollows. The contour of the disk edge can be adapted further by a metal-cutting or abrading production process to the desired functions, before priming and upsetting the rim ring. In the case of an automobile vehicle wheel the bead seat is preferably angled by approximately 5° to the wheel axis. Particularly in the case of smaller vehicle wheels, however, the bead seat could also be formed as a taper with an angling of approximately 15°. The especially preferred vehicle wheel is formed as hybrid wheel having a wheel disk of lightweight metal, such as aluminum, in particular, and a wheel disk of steel or sheet steel. In principle, however, it would also be possible to undertake the upsetting or the rollover on wheel disks and rim rings of the same material, which are both composed, for example, of lightweight metal or both of steel. The rollover could also be combined with one or more upsetting operations. The vehicle wheels according to FIGS. 1 to 3 could also be produced solely by rolling over. Even in rolling over, a reduction can be produced with a gap in the area of the bead seat section, as in the preceding exemplary embodiments. It is only preferred that the disk edge should run circumferentially with a substantially constant cross section. The disk edge could under some circumstances also be formed at radial ends of spoke struts. Adhesive or sealant could also be introduced in the gaps between the rim ring and the wheel disk edge, in order to afford additional rotational fixing.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vehicle wheel comprising a wheel disk fabricated as a casting from lightweight metal, with a disk edge running concentrically around a wheel axis and a rim ring fabricated from steel, rotationally locked to the wheel disk and having at least one rim flange, one bead seat, a drop center well base and a well base edge, wherein the wheel disk at the disk edge has a contour which is adapted to the profile of the rim flange and the well base edge and extends over an interval defined therebetween, and against which contour the rim ring bears when the wheel disk and the rim ring are in the assembled state, clamping the wheel disk between a first pressure zone on the well base edge and a second pressure zone on the rim flange, wherein a contact zone is formed between the two pressure zones at the transition of the well base edge to the bead seat, wherein the contact zone is formed by means of a security hump on the rim ring and a circumferential stay cam on the disk edge bearing on the inside thereof, and wherein in the assembled state achieved between the contact zone on the security hump and the second pressure zone on the rim flange, no direct contact areas exist between the rim ring and the disk edge.

2. The vehicle wheel as claimed in claim 1, wherein the rim ring at the contact zone is braced against the disk edge substantially only in a radial direction.

3. The vehicle wheel as claimed in claim 1, wherein the rim ring is clamped to the wheel disk by upsetting and/or rolling over at the disk edge.

4. The vehicle wheel as claimed in claim 1, wherein the rim ring and the contour of the disk edge have transitional sections at the transition of the rim flange into the bead seat where a third pressure zone is formed, in order to produce a clamping both between the first and third pressure zones and also between the second and the third pressure zones.

5. The vehicle wheel as claimed in claim 1, wherein the rim ring and the contour of the disk edge have transitional sections at the transition of the rim flange into the bead seat, which are oriented perpendicularly to the wheel axis or have an angling of >90°.

6. The vehicle wheel as claimed in claim 1, wherein the contour of the disk edge against the bead seat has a reduction, which in the assembled state produces the greatest interval between the contour of the disc edge and the rim ring.

7. The vehicle wheel as claimed in claim 1, wherein in the assembled state an inside of the rim ring is separated from the disk edge by a gap between the pressure zones and a contact zone.

8. The vehicle wheel as claimed in claim 1, wherein the contour of the disk edge against the bead seat is provided with at least one circumferential channel, into which the rim ring is partially pressed during the rollover process.

9. The vehicle wheel as claimed in claim 8, wherein the at least one circumferential channel is formed to run circumferentially or helically around the circumference of the bead seat.

10. The vehicle wheel as claimed in claim 1, wherein the rim ring, at the end that forms the rim flange bearing on the disk edge, is bent over substantially perpendicularly to the wheel axis.

11. The vehicle wheel as claimed in claim 1, wherein the first pressure zone is arranged at or close to the transition of the well base edge into a bottom of the rim well base of the rim ring.

12. The vehicle wheel as claimed in claim 1, wherein a well base edge on the wheel disk runs at an angle of approximately 55° to 65° to the wheel axis and/or the well base edge of the rim ring runs at an at least 2° steeper angle than well base edge.

13. A method for manufacturing a vehicle wheel from a wheel disk fabricated as a casting from lightweight metal, and a rim ring of steel, in operations entailing the provision of a rim ring perform having at least one rim flange, a bead seat, a drop center rim well base and a well base edge, and the provision of a wheel disk, which has a disk edge running concentrically around the wheel axis, wherein the wheel disk at the disk edge has a contour matched to the profile of the rim flange and the well base edge and extending over the distance between them, and that the rim ring perform is fixed, rotationally locked to the disk edge, by means of at least one of an upsetting operation and a rollover operation, a first pressure zone being formed between the rim ring and the wheel disk at the well base edge and a second pressure zone being formed between the rim ring and the wheel disk at the rim flange for clamping the wheel disk.

14. The method as claimed in claim 13, wherein in order to generate the clamping force, the wheel disk is provided, at least in the bead seat, with a reduction, into which the bead seat of the rim ring is pressed in the at least one of the upsetting and rollover operation to compensate for rebound occurring.

15. The method as claimed in claim 13 wherein the upsetting operation is performed by means of multi-jaw upsetting tools, each upsetting jaw preferably having a shape which is substantially a negative shape of the finished rim ring, the negative shape in the area of the bead seat over-upsetting the rim ring preform.

16. The method as claimed in claim 13 wherein the rollover operation is performed by means of at least one pressure roller, the setting angle of the pressure roller being adjustable relative to the wheel axis.

17. The method as claimed in claim 16, wherein in the rollover operation material of the rim ring is at least partially pressed into channels in the disk edge.

18. The method as claimed in claim 13, wherein in the at least one of the upsetting or rollover operation a contact zone is formed at a transitional section between the bead seat and the well base edge, the rim ring being upset or pressed into contact with the disk edge only at the two pressure zones and at the contact zone.

* * * * *